US012694353B2

(12) United States Patent
Strömberg et al.

(10) Patent No.: US 12,694,353 B2
(45) Date of Patent: *Jul. 28, 2026

(54) MANAGEMENT SYSTEMS FOR EVALUATION AND CONTINUOUS IMPROVEMENT OF WORKFLOWS INVOLVING HEAVY-DUTY VEHICLES

(71) Applicant: VOLVO TRUCK CORPORATION, Gothenburg (SE)

(72) Inventors: Bo Strömberg, Västra Frölunda (SE); Per Sohlberg, Hovås (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 416 days.

This patent is subject to a terminal disclaimer.

(21) Appl. No.: 18/166,205

(22) Filed: Feb. 8, 2023

(65) Prior Publication Data

US 2023/0251638 A1 Aug. 10, 2023

(30) Foreign Application Priority Data

Feb. 10, 2022 (EP) .................................... 22156062

(51) Int. Cl.
*G06Q 10/0633* (2023.01)
*G06Q 10/0631* (2023.01)
*G06Q 50/08* (2012.01)

(52) U.S. Cl.
CPC ... *G06Q 10/0633* (2013.01); *G06Q 10/06312* (2013.01); *G06Q 50/08* (2013.01)

(58) Field of Classification Search
CPC ............. G06Q 10/06; G06Q 10/06313; G06Q 10/0639; G06Q 50/08; G06T 7/001; E01C 19/23
See application file for complete search history.

(56) References Cited

U.S. PATENT DOCUMENTS 6,263,265 B1 7/2001 Fera
8,275,522 B1 9/2012 Groeneweg et al.
(Continued)

FOREIGN PATENT DOCUMENTS

EP 3791236 A1 3/2021

OTHER PUBLICATIONS

V2X -wikipedia (Year: 2022); https://web.archive.org/web/20220115163356/https://en.wikipedia.org/wiki/Vehicle-to-everything#expand, retrieved May 15, 2025.*
(Continued)

*Primary Examiner* — Brian P Wolcott

(74) *Attorney, Agent, or Firm* — Jeffri A. Kaminski; Venable LLP

(57) ABSTRACT

A production asset monitoring system, for monitoring current operating states of one or more production assets, associates a respective state machine which each asset in the one or more production assets, where each state machine implements a plurality of operating states, out of which operating states at least one state is categorized as a productive state and at least one state is categorized as an unproductive state. The production asset monitoring system further comprises a sensor system configured to detect a current operating state for each state machine, and the production asset monitoring system is configured to aggregate the states of a plurality of assets into a report indicative of production asset utilization.

10 Claims, 2 Drawing Sheets

(56) References Cited

U.S. PATENT DOCUMENTS

| | | | | |
|---|---|---|---|---|
| 9,460,051 | B2* | 10/2016 | Horne | ..................... G06F 17/00 |
| 10,631,130 | B2 | 4/2020 | Esenwein et al. | |
| 11,288,614 | B2* | 3/2022 | Alayamani | .... G06Q 10/063114 |
| 2003/0074134 | A1 | 4/2003 | Shike et al. | |
| 2004/0021563 | A1* | 2/2004 | Mahoney | ............... G06Q 10/08 |
| | | | | 340/684 |
| 2004/0073468 | A1* | 4/2004 | Vyas | ................ G06Q 10/06315 |
| | | | | 705/7.38 |
| 2004/0148083 | A1* | 7/2004 | Arakawa | ................ G07C 5/085 |
| | | | | 701/50 |
| 2007/0124000 | A1* | 5/2007 | Moughler | .......... G05B 19/0426 |
| | | | | 701/50 |
| 2008/0084324 | A1 | 4/2008 | Wallace et al. | |
| 2008/0086427 | A1 | 4/2008 | Wallace | |
| 2010/0036696 | A1* | 2/2010 | Lang | .................... A01B 79/005 |
| | | | | 702/182 |
| 2010/0152962 | A1 | 6/2010 | Bennett et al. | |
| 2010/0324955 | A1* | 12/2010 | Rinehart | ............... G06Q 10/06 |
| | | | | 705/7.36 |
| 2011/0184784 | A1 | 7/2011 | Rudow et al. | |
| 2013/0046525 | A1* | 2/2013 | Ali | ...................... G05D 1/0221 |
| | | | | 703/6 |
| 2013/0104064 | A1* | 4/2013 | McCormick | ........ G06F 3/04842 |
| | | | | 715/765 |
| 2013/0109375 | A1 | 5/2013 | Zeiler et al. | |
| 2013/0261876 | A1 | 10/2013 | Froom et al. | |
| 2015/0161969 | A1 | 6/2015 | Zaizen et al. | |
| 2016/0292846 | A1* | 10/2016 | Sprock | ................... G06T 7/001 |
| 2016/0328890 | A1 | 11/2016 | Keane et al. | |
| 2017/0284072 | A1* | 10/2017 | Jensen | ................. E02F 9/2054 |
| 2018/0225895 | A1* | 8/2018 | Oda | ...................... G07C 5/008 |
| 2020/0109527 | A1 | 4/2020 | McAlpine et al. | |
| 2025/0013973 | A1* | 1/2025 | Strömberg | ............. H04W 4/40 |

OTHER PUBLICATIONS

Extended European Search Report in corresponding European Application No. 22156062.6 dated Jul. 19, 2022 (10 pages).
Wikipedia contributors: "Vehicle-to-everything"; https://en.wikipedia.org/wiki/Vehicle-to-everything; ID: 847643174; retrieved May 7, 2022; XP 2806989A; 4 pages.
International Preliminary Report on Patentability dated Oct. 17, 2023 in corresponding International Application No. PCT/EP2023/052935, 6 pages.
V2X—wikipedia (Year: 2022); https://web.archive.org/web/20220115163356/https://en.wikipedia.org/wikiNehicle-to-everything# expand, retrieved May 15, 2025.
International Search Report and Written Opinion of the International Searching Authority in corresponding International Application No. PCT/EP2023/052935 mailed Mar. 15, 2023 (15 pages).
Non Final Office Action dated Jun. 9, 2026 in corresponding U.S. Appl. No. 18/834,771, 32 pages.

* cited by examiner 300
310
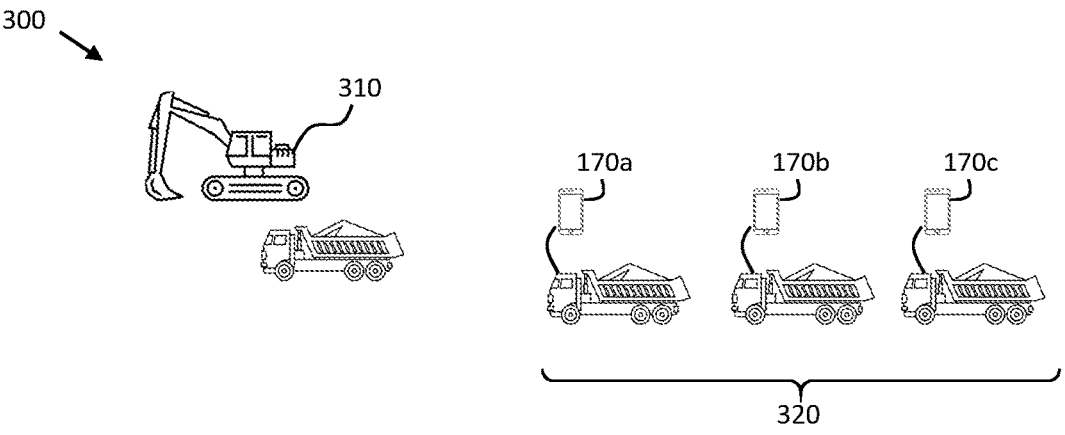
170a        170b        170c
320
FIG. 3
400
410
420
430
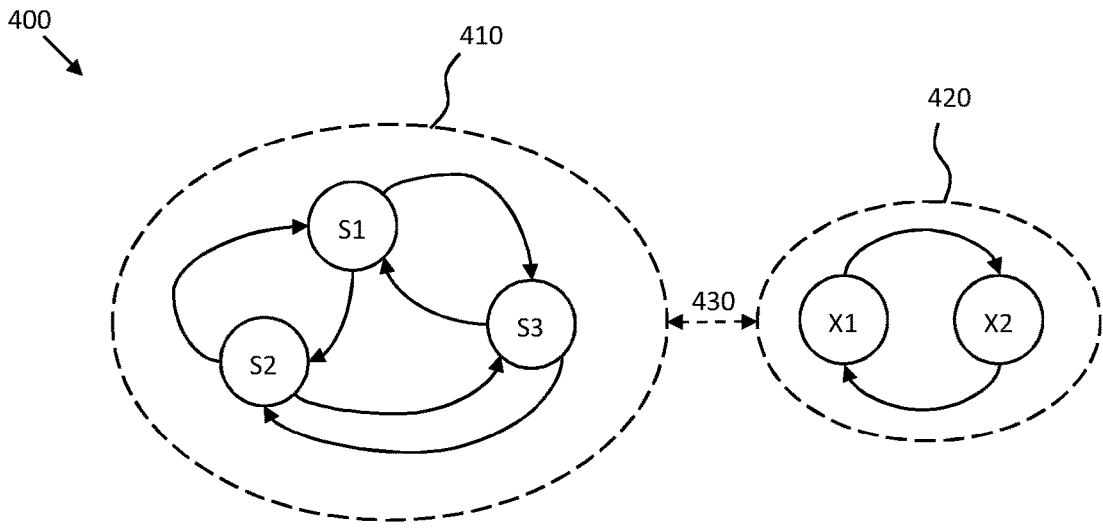
FIG. 4
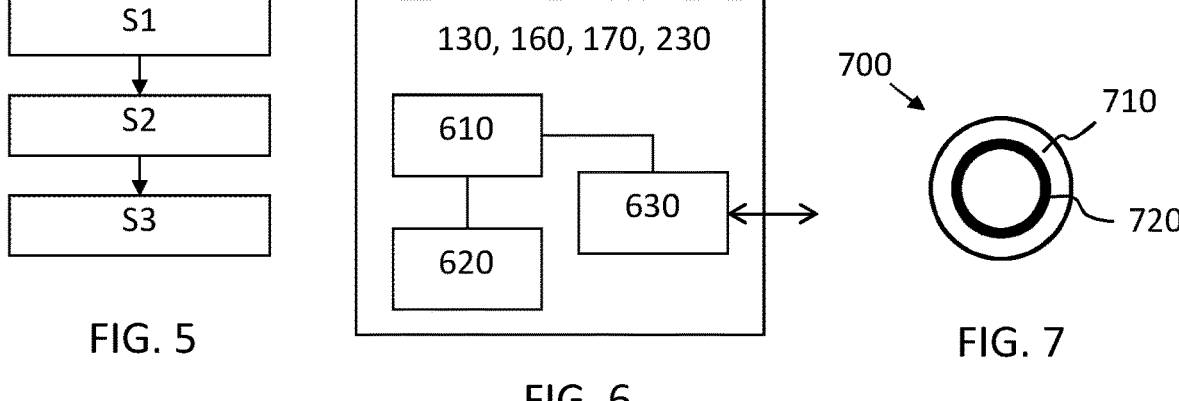
FIG. 5
FIG. 6
FIG. 7
700
710
720

MANAGEMENT SYSTEMS FOR EVALUATION AND CONTINUOUS IMPROVEMENT OF WORKFLOWS INVOLVING HEAVY-DUTY VEHICLES

TECHNICAL FIELD

This invention relates generally to heavy-duty vehicles such as trucks and construction machines and in particular to dump trucks and excavators for use in mass excavation projects. Methods and management systems for evaluation and continuous improvement of workflows involving heavy machinery are disclosed, and also wireless portable devices and in-vehicle support systems adapted for the task.

BACKGROUND

Larger infrastructure projects and distribution systems for goods normally involve many different entities which perform respective sub-tasks in complex interdependency. For instance, in a mass excavation project excavators dig out material which is then transported away from the work site to a material deposit site by dump trucks. The deposit site, the dump trucks, and the excavators all have their respective capacities which need to be matched to each other in order to maintain a high project efficiency.

There is a desire to monitor the degree of efficiency that is currently being achieved in a given project, both on the production asset level as well as on application task level and project level, and to present the analysis results to the relevant stakeholders. Some example projects where this is desirable include, e.g., large construction projects, mass excavation projects, and large-scale mining operations. Management systems for this purpose that are easy to use, and which do not require extensive production asset upgrades are therefore desired.

Since larger infrastructure projects often involve equipment from several different manufacturers and of varying age, it is furthermore desired that the management systems are agnostic to the equipment type and brand that are used in a given project.

SUMMARY

It is an object of the present disclosure to provide management systems for evaluation and continuous improvement of workflows involving heavy-duty vehicles. This object is at least in part obtained by a production asset monitoring system, for monitoring current operating states of one or more production assets. The production asset monitoring system is arranged to associate a respective state machine which each asset in the one or more production assets, where each state machine implements a plurality of operating states, out of which operating states at least one state is categorized as a productive state and at least one state is categorized as an unproductive state. The production asset monitoring system further comprises a sensor system configured to automatically detect a current operating state for each state machine, and the production asset monitoring system is configured to aggregate the states of a plurality of assets into a report indicative of production asset utilization.

This results in a state machine which transitions between states as time progresses. The occupancy pattern of various states and the transitions between states provides valuable input to the management systems for evaluation and continuous improvement of workflows involving heavy-duty vehicles. For instance, the amount of productive time associated with a given asset can be determined by monitoring the transitions of the state machine, and keeping track of how much time is spent in a given state or a given category of states.

The one or more state machines are preferably implemented on respective portable wireless devices 170. This means that the state machine executes, e.g., on a smart phone or a tablet device which an operator brings with him at the start of the work shift. These devices are separate from the actual production asset, and can therefore be used in an agnostic manner when it comes to type of production asset, brand, or version. It is an advantage that the state machines do not require complex updates to existing production assets. Of course, some or all state machines can also be executed on in-vehicle control units, or at least partly on remote devices such as cloud-based server solutions and the like.

According to some aspects, a transition between two states of a first state machine in the production asset monitoring system is conditioned on a current state of an associated second state machine. This allows for definitions of interdependencies between two or more state machines to form a more complex system of state machines. For instance, a given production asset may only be categorized as being in a productive state if also a number of other production assets are productive. To give a simple example—suppose that a conveyor belt is associated with a state machine, and the conveyor belt is currently in an active state where the conveyor belt moves. If no dump truck is at the location of the conveyor belt and is being loaded, then the state of the conveyor belt may not be a productive state, despite the conveyor belt being in a moving state.

The quality of the production may also be an important parameter in determining whether a given production asset is in a productive state or not. For instance, suppose that a paving train comprising, e.g., screeds and compactors are producing in the sense that asphalt is being laid, but the quality of the road surface produced is not satisfactory (as determined by a surveyor machine), then the state may still be categorized as unproductive.

The one or more production assets may comprise any of an excavator, a conveyor belt, a wheel loader, and/or a dump truck.

According to other aspects, the states in at least one of the state machines comprises a transporting state, a loading state, an unloading state, and a waiting state, where the transporting state, the loading state, and the unloading state are categorized as productive states and the waiting state is categorized as an unproductive state. The state machine can also be configured to monitor an asphalt laying process, landfill operation, or the like, where for example pavers, compactors, graders, concrete trucks and pumps, and other assets are active.

The production asset monitoring system is optionally also arranged to determine a correlation between the occupied states in one of the state machines with respect to the occupied states of another state machine, and to detect a dependency between two production assets based on the correlation. This allows an operator of some production process to identify more complex interdependencies between the various operations of the production assets in a project. Suh dependencies may otherwise be hard to detect and analyze. The interdependencies discovered based on this mechanism can be in several steps. For instance, a connection between two production assets via a third production asset can be identified and corrected in order to make the overall production process more efficient.

The sensor systems discussed herein may comprise one or more positioning systems associated with respective state machines. Positioning systems based on, e.g., proximity to landmarks, global positioning systems, and other means of localization can be used to obtain information about the current operating state of a given production asset. For instance, a truck which is located at a service and maintenance point is most likely not in a productive state, which an excavator located at a digging site may very well be producing.

The sensor systems used to automatically detect state transitions may also comprise one or more V2X communication systems associated with the respective state machines. The V2X systems may be used to collect data from other vehicles and devices in the infrastructure, from which data a current state can be discerned. The transmission exploited by the V2X system for data gathering and state machine update need not necessarily be intended for the state machine system per se. Rather, the V2X system can be used to sniff the wireless communication media for data which can be used to update the state machine. For instance, a transmission from a loading asset to a transportation asset signaling loading completion.

The sensor system may of course also comprise one or more on-board vehicle sensor systems associated with respective state machines. Such sensors may range from pressure sensors, hydraulic system transducers, and other forms of actuator signals which can be used to determine a current operating state of a production asset.

There is also disclosed herein methods, computer programs, computer readable media, computer program products, remote servers, wireless devices and vehicles associated with the above discussed advantages.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

With reference to the appended drawings, below follows a more detailed description of embodiments of the invention cited as examples. In the drawings:

FIG. 3 shows an example of inefficiency in an infrastructure project;
FIG. 4 schematically illustrates a state machine;
FIG. 5 is a flow chart illustrating a method;
FIG. 6 schematically illustrates a control unit;
and
FIG. 7 shows an example computer program product.

DETAILED DESCRIPTION OF EXAMPLE EMBODIMENTS OF THE INVENTION

Figure 1:
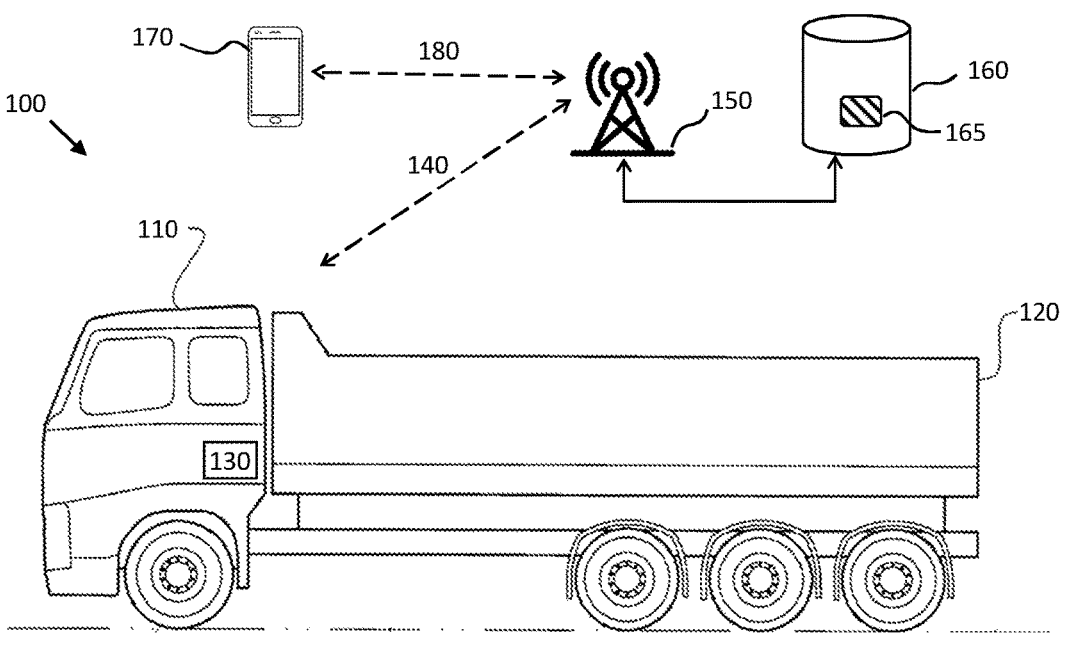
FIG. 1 shows an example heavy-duty vehicle.

The invention will now be described more fully hereinafter with reference to the accompanying drawings, in which certain aspects of the invention are shown. This invention may, however, be embodied in many different forms and should not be construed as limited to the embodiments and aspects set forth herein; rather, these embodiments are provided by way of example so that this disclosure will be thorough and complete, and will fully convey the scope of the invention to those skilled in the art. Like numbers refer to like elements throughout the description.

It is to be understood that the present invention is not limited to the embodiments described herein and illustrated in the drawings; rather, the skilled person will recognize that many changes and modifications may be made within the scope of the appended claims.

FIG. 1 illustrates an example vehicle 100 for cargo transport where the herein disclosed techniques can be applied with advantage. The example vehicle 100 is a dump truck comprising a cab 110 and a bed 120 which can be used to transport material away from a mass excavation site, for instance as part of a larger infrastructure project such as a road construction project, a tunnel construction project, or a building site. An excavator, wheel loader, or other form of loading asset is used to load material onto the dump truck, which then transports the material away to a destination where the material is unloaded.

A control unit 130 on the vehicle may be in communication with a remote server 160 via wireless link 140 over an access point 150 that could form part of a cellular access network such as a fifth generation (5G) or sixth generation (6G) wireless access network. The control unit 130 may comprise processing circuitry, as will be discussed below in connection to FIG. 6.

A heavy duty vehicle 100 such as a dump truck or an excavator can be associated with a number of different operating states. For instance, a dump truck may be associated with a transporting state where the dump truck is transporting material from one site to another site, a loading state where material is being loaded onto the dump truck, and an unloading state where material is being unloaded from the dump truck. Both loading, transporting, and unloading can be categorized as productive states where the machine is contributing to the project it is part of. The dump truck may also be associated with one or more unproductive or passive states, such as a waiting state where the vehicle is waiting to get loaded or unloaded, a turned-off state where the machine is powered down, and/or a blocked state where the vehicle is prevented from operating or is forced to operate at reduced speed due to traffic, on-site personnel, or other form of blockages.

Generally, heavy-duty vehicles and machinery such as dump trucks, excavators, wheel loaders and conveyor belts are referred to herein as production assets. A production asset is associated with an identification of some sorts, allowing an operator to identify a particular asset among a group of assets, even if the group of assets comprise equipment of the same type and brand. One such form of identification is a registration number which most public road vehicles are associated with. A serial number or the like can also be considered as identification data. An operation involving one or more production assets can be evaluated on different levels of granularity. The levels may comprise a production asset level where data related to a given production asset is evaluated, application level, i.e., activity or task such as digging or transporting which involves a plurality of different operations. A work step level is the level where more than one asset is performing a job or is acting as part of a supply chain. Finally, a production level comprises an entire value adding operation. For instance, in a mass excavation project, the production level would involve both excavators performing excavation and loading, transport assets which transport the material away from the excavation site to a deposit site of some sort, as well as the operations performed at the deposit site to unload the transportation assets. It has been realized that various forms of sensors and also wireless communication systems involving the production assets can be used to detect which operating state out of a plurality of operating states that a production asset is currently in. Various sensor technologies can be used for the purpose, including pressure transducers configured to detect when hydraulic cylinders of an excavator are being actively used, microphones or vibration sensors arranged to detect when a machine is operating, positioning systems that may determine when a machine is moving, or is located at some key location associated with a given type of activity, such as refueling or maintenance operations.

This disclosure relates to various implementations of a state machine on one or more production assets where the states can be detected and logged by means of, e.g., on-board sensors, external sensors, asset positioning systems, and communication links to other production assets. The state machine of a given production asset is then continuously updated as the asset is performing different tasks or is being prevented from performing a task due to some external circumstances, such as a traffic jam, equipment service and maintenance, and equipment failure. The state machine can be used by a production asset management system for evaluating performance and utilization on both asset level and application level. The production asset management system can for instance be used to evaluate a relative percentage of productive state occupancy in relation to unproductive state occupancy, where of course it is desired to keep the level of productive state occupancy as high as possible in relation to the unproductive state occupancy. A given asset state machine can also be combined with state machines of other production assets, to aggregate performance and utilization data up to work step and production level.

Some interesting aspects of the present disclosure involve time series analysis of the state transitions in a group of related state machines. By detecting correlations in state transitions among the production assets, complex dependencies can be identified which can be used to optimize a given production process.

The data obtained from such a system of state machines can then be analyzed and presented to relevant stakeholders, for instance as part of a production monitoring human-machine interface (HMI). The relevant stakeholders can then use the data as base for decisions for corrective actions and optimization of the value adding operation that is being analyzed. The HMI can also be integrated into a project planning software package, where it can be used to provide important data for improving efficiency of a given project plan.

In more general terms, there is disclosed herein a production asset monitoring system for monitoring current operating states of one or more production assets. The production assets may, e.g., comprise excavators, a conveyor belts, wheel loaders, and/or dump trucks. The production asset monitoring system is arranged to associate a respective state machine which each asset in the one or more production assets, where each state machine implements a plurality of operating states, out of which operating states at least one state is categorized as a productive state and at least one state is categorized as an unproductive state. The production asset monitoring system also comprises a sensor system configured to automatically detect a current operating state for each state machine as thus at least implicitly also transitions between states in each state machine. This means that the need for manually configuring a current state or each asset as it transitions between different work tasks and to and from productive operating states is limited, which is an advantage. Of course, manual configuration of state machines can still be implemented in some systems, to allow operators to manually configure the state machine, but this is entirely optional given the feature of automated sensor-based state detection. The production asset monitoring system is then configured to aggregate the states of a plurality of assets into a report indicative of production asset utilization.

A state machine and devices for detecting which state a given production asset is currently in can be implemented in various manners, ranging from a realization in a portable wireless device such as a smartphone or tablet device, to dedicated vehicle sensors, processing and HMI. External data can also be gathered, e.g., via vehicle to vehicle (V2V) and vehicle to infrastructure (V2I) wireless communication systems, often collectively referred to as vehicle to anything (V2X) communication. The different production asset states can then be uploaded to a central processing unit or can be processed locally, possibly in a distributed manner of processing.

The state detection arrangement for each production asset can also be implemented in a site system or "cloud platform", e.g., on the remote server 160 as a collection of state machines 165, which is gathering data from assets involved in a given project or application. The site system then processes the information and generates reports to relevant stakeholders. One or more state machines can of course also execute on respective on-board vehicle control units 130

Data can be transferred within the production asset monitoring system in real time, near real time or at fixed intervals depending on the need for follow-up of the current efficiency in a given project. Data can also be transferred on-demand or triggered by the occurrence of some predetermined event.

It is generally understood that many different types of sensors can be used to detect and/or to indirectly infer in which state a given state machine is in. Positioning systems are suitable for determining where a given production asset is currently located, and can thereby be used to infer a current operating state of the asset. Position sensors may comprise satellite system receivers such as global positioning system receivers (GPS), or local positioning systems such as proximity sensors or vision-based systems such as vision-based registration plate readers and various forms of radio-frequency ID (RFID) systems. For instance, a production asset located at a workshop, servicing center, or refueling station can be assumed to be in an unproductive operating state, i.e., not currently contributing to the general progress of the project to which it has been assigned. On the other hand, a transportation asset en route from one project site to another project site is most likely performing a productive task of transporting some material, unless some other sensor indicates that the transportation asset is currently unloaded, or if a load receipt has not been generated in some period of time.

The relations between sensor signals and the states of each state machine can be predetermined or adapted over time. For instance, the states and associated state transitions of a given state machine may be associated with a set of fixed manually configured rules that define the operations of the state machine in response to various forms of sensor signals. For instance, a simple state machine may comprise an active state and an inactive state, where the active state of the state machine is entered as soon as the machine is performing some sort of operation, e.g., is operating is hydraulic system as detected by a pressure transducer, or is moving as detected by an on-board positioning system.

The relations between sensor signals and the states of each state machine can also be adapted over time, perhaps as part of an artificial intelligence system which is configured by training. Such training may then comprise sensor signal inputs along with ground truth, i.e., a set of state transitions which have been either manually configured or pre-recorded.

The state machine configuration for a given type of production asset, including the rules for transitioning between states, can be pre-configured at the start of a production project, e.g., as part of the project planning.

The sensor system may also comprise one or more V2X communication systems associated with respective state machines as mentioned above. A V2V, V2I, or V2X system can be used to exchange data between different production assets, and this data can be used to update the various state machines associated with some type of asset interaction. Communication of a load receipt from one production asset to another production asset is a good example of how a V2X system can be used to infer the current state of a state machine associated with some production asset. It is also appreciated that a V2X system can be used to force a state transition in a production asset. For instance, an excavator loading a transportation asset may communicate with the loading asset via V2X and trigger a state change into a loading state in the state machine of the transportation asset. Once the loading is done, a load receipt may be generated, and a state transition can be forced which places the state machine of the transportation asset in some other state than the active loading state.

Referring again to FIG. 1, the control unit 130 may optionally be arranged to determine a current load on the bed 120, and to report this load to the remote server 160 or to the wireless device 170 associated with the production asset, possibly together with data such as identification data to identify the vehicle 100, a time stamp, a starting location, and a destination of the current transport mission. This type of data may be referred to as a digital load receipt. A digital load receipt can also be issued by the loading asset, e.g., an excavator or a wheel loader. These loading assets may also comprise respective on-board control units and systems configured to determine a weight of loaded material, and format a report which may also comprise other data items, such as identification data to identify the loading asset, along with a timestamp. These load receipts are equipment agnostic and can be used to infer a state of, e.g., a transportation asset such as a dump truck. The load receipts can also be used to infer a current state in a state machine associated with a production asset used for loading transportation assets. For instance, an excavator or wheel loader which is generating load receipts can be assumed to be in a productive state, whereas an asset which has not generated a load receipt in a given period of time can be assumed to be in an unproductive state of operation. In this manner a state machine can be associated with a plurality of production assets based on the generation of load receipts in a project such as a mass excavation project.

It is furthermore understood that on-board vehicle sensor systems can also be used to update the various state machines comprised in the production asset monitoring system. For instance, a vibration sensor or microphone can be used to infer when a given machine is operating and when it is stationary, perhaps also powered down. A vision-based sensor, a radar transceiver, or a lidar system can of course also be used to determine when a production asset is moving and when it is in stand-still state. Pressure sensors on a hydraulic system can be used to infer when an excavator is excavating and when it is not performing any productive tasks.

Figure 2:
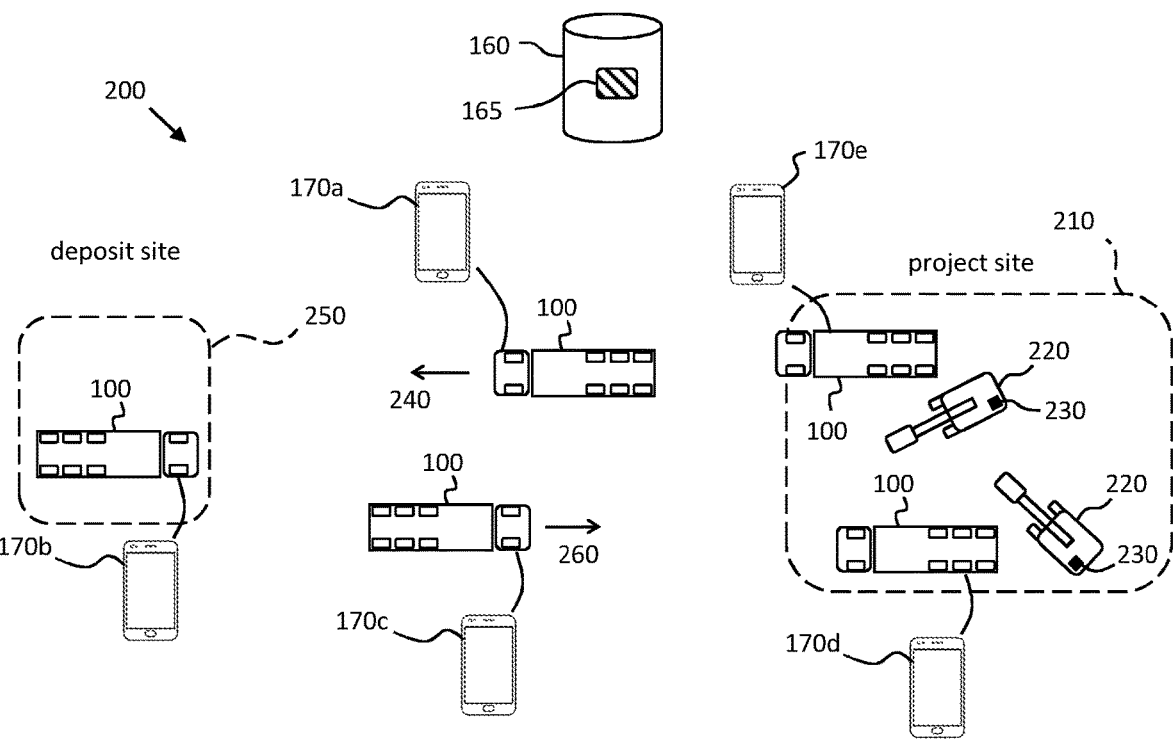
FIG. 2 schematically illustrates a mass excavation project.

FIG. 2 illustrates an example production process in a mass excavation project 200. There are one or more project sites 210 in the project where excavators 220 are used to dig up material which is then loaded onto dump trucks 100. The trucks 100 then transport the excavated material away to one or more active deposit sites 250, before returning 260 again to the project site to receive a new load. Note that, generally, a project can comprise more than one project site and more than one deposit site.

The excavators 220 in the example of FIG. 2 comprises control units 230 which are arranged to generate data such as load receipts. A load receipt is a unit of data which indicates, e.g., a weight of the material that has been loaded onto a given dump truck 100. The load receipts are uploaded to the remote server 160, or shared with a wireless device 170a, 170b, 170b, 170d, 170e associated with a given production asset.

A collection of obtained such load receipts constitute historical load data associated with transports of the project at the site, and if the load receipts associated with a given production asset are considered over time, they may be used to infer transitions between states of a state machine associated with the production assess, i.e., to monitor when the production asset transitions from a productive state into an unproductive state and back again.

A unit of historical load data is generally associated with some form of time stamp which indicates when during the day that the load was transported. A date is often also included in a unit of historical load data, as well as a source location and a destination allowing to identify the transport route of a given transport. These digital load receipts provide information about the specific project, such as natural variations in production rate over a week. The information in the digital load receipts can also be complemented by additional data, such as weather reports, ambient temperatures, and traffic reports which indicate traffic density along, e.g., key routes.

Of course, load data can also be obtained from other sources, such as the dump trucks which may be configured to measure a weight of transported material. A device located at the deposit site may also comprise means for determining a weight of the material deposited by a given dump truck.

FIG. 3 illustrates an example 300 of how a global positioning systems such as a GPS receiver, arranged, e.g., in a wireless device 170a, 170b, 170c can be used to detect that one or more production assets have transitioned into a waiting state (which is categorized as unproductive). In FIG. 3 the production asset 310 tasked with loading material onto dump trucks has failed for some reason, and the dump trucks have therefore queued up 320 waiting to receive material for transport away from the excavation site. A reasonable action to perform in such a case is to reallocate dump trucks to different excavators. It is a purpose of the systems discussed herein to facilitate such reallocation by providing the necessary information to the operator.

FIG. 4 schematically illustrates an example state machine 400 associated with some production asset. The state machine comprises a set of internal states 410, here denoted as S1, S2 and S3, and also a set of external states, here denoted as X1 and X2. The two sets of states are optionally in some form of dependency 430 with respect to each other. For instance, suppose state S3 is associated with a loading state, then the state machine 410 may be configured to only enter this state in case another production asset is on a given state, say X1. For instance, suppose that the state transitions between states S1, S2, and S3 are governed by geographical position, and that state S1 is an unproductive state (or subset of states). Then, the state machine may only transition into state S3 if there is an active material loading asset nearby tasked with loading material onto the production asset. If this is not the case, then the production asset will be placed in state S1 since it is inactive at the loading site and waiting to receive material for transport away from the site. Thus, generally, a transition between two states S1, S2, S3 of a first state machine 410 in the production asset monitoring system is optionally conditioned on a current state X1, X2 of an associated second state machine 420.

The state machines of the different production assets transition between states over time. Sometimes a dependency arises between the states of one state machine and the states of another state machine. This type of dependency can be very interesting from an efficiency management point of view. The production asset monitoring systems discussed herein are optionally arranged to determine a correlation between the occupied states in one of the state machines with respect to the occupied states of another state machine, and to detect a dependency between two production assets based on the correlation. Correlation can, for instance, be determined from a relatively straight forward time series analysis of the transitions in one state machine compared to the transitions in another state machine. In case a dependency is identified, it can be used to investigate the root cause of a given inefficiency in a project. Suppose for instance that a dependency between the state machine of a conveyor belt and the state machines of a group of transportation assets is detected. Suppose further that the state machines of the transportation vehicles are detected as entering into an unproductive state in correlation with the state transitions of the conveyor belt. This may be indicative of an inefficiency that can perhaps be remedied by adding another conveyor belt to the operation, or by reconfiguration of the transportation strategies in the overall production project.

FIG. 5 is a flow chart which briefly summarizes the above discussion in terms of a method. It is appreciated that the various optional aspects of the above discussed techniques can be incorporated as parts of the method in a straight forward manner. The method can be performed on any of the above discussed processing devices, i.e., in the vehicle control unit 130, on the remote server 160, and/or on the wireless device 170. It is furthermore appreciated that the method can be distributed over more than one processing unit, and also over more than one type of processing unit.

FIG. 5 schematically illustrates a computer implemented method executed in a production asset monitoring system, for monitoring current operating states of one or more production assets. As discussed above, the method comprises associating S1 a respective state machine which each asset in the one or more production assets, where each state machine implements a plurality of operating states, out of which operating states at least one state is categorized as a productive state and at least one state is categorized as an unproductive state, detecting S2 a current operating state for each state machine based on output data from a sensor system configured to detect the current operating state for each state machine, and aggregating S3 the states of a plurality of assets into a report indicative of production asset utilization.

FIG. 6 schematically illustrates, in terms of a number of functional units, the components of a control unit such as the VUC 130, 230 or the remote server 160. The control unit is configured to execute at least some of the functions discussed above for control of a heavy-duty vehicle 100. Processing circuitry 610 is provided using any combination of one or more of a suitable central processing unit CPU, multiprocessor, microcontroller, digital signal processor DSP, etc., capable of executing software instructions stored in a computer program product, e.g. in the form of a storage medium 620. The processing circuitry 610 may further be provided as at least one application specific integrated circuit ASIC, or field programmable gate array FPGA.

Particularly, the processing circuitry 610 is configured to cause the control unit 101 to perform a set of operations, or steps, such as the methods discussed in connection to FIG. 5. For example, the storage medium 620 may store the set of operations, and the processing circuitry 610 may be configured to retrieve the set of operations from the storage medium 620 to cause the control unit 600 to perform the set of operations. The set of operations may be provided as a set of executable instructions. Thus, the processing circuitry 610 is thereby arranged to execute methods as herein disclosed.

The storage medium 620 may also comprise persistent storage, which, for example, can be any single one or combination of magnetic memory, optical memory, solid state memory or even remotely mounted memory.

The control unit 130, 160, 230 may further comprise an interface 630 for communications with at least one external device. As such the interface 630 may comprise one or more transmitters and receivers, comprising analogue and digital components and a suitable number of ports for wireline or wireless communication.

The processing circuitry 610 controls the general operation of the control unit, e.g., by sending data and control signals to the interface 630 and the storage medium 620, by receiving data and reports from the interface 630, and by retrieving data and instructions from the storage medium 620. Other components, as well as the related functionality, of the control node are omitted in order not to obscure the concepts presented herein.

FIG. 7 illustrates a computer readable medium 710 carrying a computer program comprising program code means 720 for performing the methods illustrated in FIG. 5, when said program product is run on a computer. The computer readable medium and the code means may together form a computer program product 700.

The invention claimed is:

1. A production asset monitoring system, for monitoring current operating states of one or more production assets in a project, where the production asset monitoring system comprises a control unit arranged to associate a respective state machine with each asset in the one or more production assets, where each state machine implements a plurality of operating states, out of which operating states at least one state is categorized as a productive state and at least one state is categorized as an unproductive state, where the production asset monitoring system further comprises a sensor system configured to detect a current operating state for each state machine, where the sensor system comprises at least one of:

one or more positioning systems associated with respective state machines, one or more V2X communication systems associated with the respective state machines, and one or more on-board vehicle sensor systems associated with the respective state machines, where the control unit is further arranged to determine a correlation between one or more occupied states in one of the state machines with respect to the occupied states of another state machine, and to detect a dependency between two production assets based on the correlation, where the control unit is configured to aggregate the occupied states detected by the sensor system into a report indicative of production asset utilization, and wherein the control unit is further configured to identify inefficiencies in a production workflow based on the detected dependency and to dynamically adjust production asset utilization by:

reconfiguring transportation strategies or reallocating production assets to remedy the inefficiencies and improve overall efficiency of the project; and triggering one or more changes in the current operating states of the one or more production assets based on reconfiguring or the reallocating.

2. The production asset monitoring system according to claim 1, where one or more state machines are implemented on respective portable wireless devices.

3. The production asset monitoring system according to claim 1, where one or more state machines are implemented on respective on-board vehicle control units.

4. The production asset monitoring system according to claim 1, where the production asset monitoring system is at least partly implemented on a remote server accessible via wireless link from the production assets and/or from associated wireless devices.

5. The production asset monitoring system according to claim 1, where a transition between two states of a first state machine in the production asset monitoring system is conditioned on a current state of an associated second state machine.

6. The production asset monitoring system according to claim 1, where the one or more production assets comprises an excavator, a conveyor belt, a wheel loader, and/or a dump truck.

7. The production asset monitoring system according to claim 1, where the states in at least one of the state machines comprises a transporting state, a loading state, an unloading state, and a waiting state, where the transporting state, the loading state, and the unloading state are categorized as productive states and the waiting state is categorized as an unproductive state.

8. A computer implemented method executed in a production asset monitoring system, for monitoring current operating states of one or more production assets in a project, the method comprising:

associating a respective state machine with each asset in the one or more production assets, where each state machine implements a plurality of operating states, out of which operating states at least one state is categorized as a productive state and at least one state is categorized as an unproductive state, detecting a current operating state for each state machine based on output data from a sensor system configured to detect the current operating state for each state machine, where the sensor system comprises at least one of:

one or more positioning systems associated with respective state machines, one or more V2X communication systems associated with the respective state machines, and one or more on-board vehicle sensor systems associated with the respective state machines, determining a correlation between one or more occupied states in one of the state machines with respect to the occupied states of another state machine, detecting a dependency between two production assets based on the correlation, aggregating the occupied states detected by the sensor system into a report indicative of production asset utilization, identifying inefficiencies in a production workflow based on the detected dependency, dynamically adjusting production asset utilization by reconfiguring transportation strategies or reallocating production assets to remedy the inefficiencies and improve overall efficiency of the project, and triggering one or more changes in the current operating states of the one or more production assets based on reconfiguring or the reallocating.

9. A remote server comprising processing circuitry arranged to execute the method according to claim 8.

10. A wireless device comprising processing circuitry arranged to execute the method according to claim 8.

\* \* \* \* \*